Oct. 8, 1968    Y. BOT-LANGLET    3,404,541
DEVICE FOR SPRAY-FREEZING LIQUIDS
Filed April 3, 1967    2 Sheets-Sheet 1

Oct. 8, 1968     Y. BOT-LANGLET     3,404,541
DEVICE FOR SPRAY-FREEZING LIQUIDS
Filed April 3, 1967     2 Sheets-Sheet 2

United States Patent Office 3,404,541
Patented Oct. 8, 1968

3,404,541
DEVICE FOR SPRAY-FREEZING LIQUIDS
Yves Bot-Langlet, Boulogne-Billancourt, France, assignor to Societe Anonyme Heurtey, Paris, France
Filed Apr. 3, 1967, Ser. No. 627,767
Claims priority, application France, Apr. 8, 1966, 57,054; May 16, 1966, 61,739; June 10, 1966, 64,998
2 Claims. (Cl. 62—314)

ABSTRACT OF THE DISCLOSURE

Apparatus for deep-freezing products, notably liquids such as liquid foods, characterized in that carbon dioxide in the gaseous phase is injected into the lower portion of a tower-shaped vessel at a very low temperature approximating for example $-80°$ C. ($-112°$ F.), and that the product to be frozen is atomized into the upper portion of said vessel, whereby the carbon dioxide gas and the product will circulate in counter-current relationship during the product deep-freezing process.

---

Figure 1:
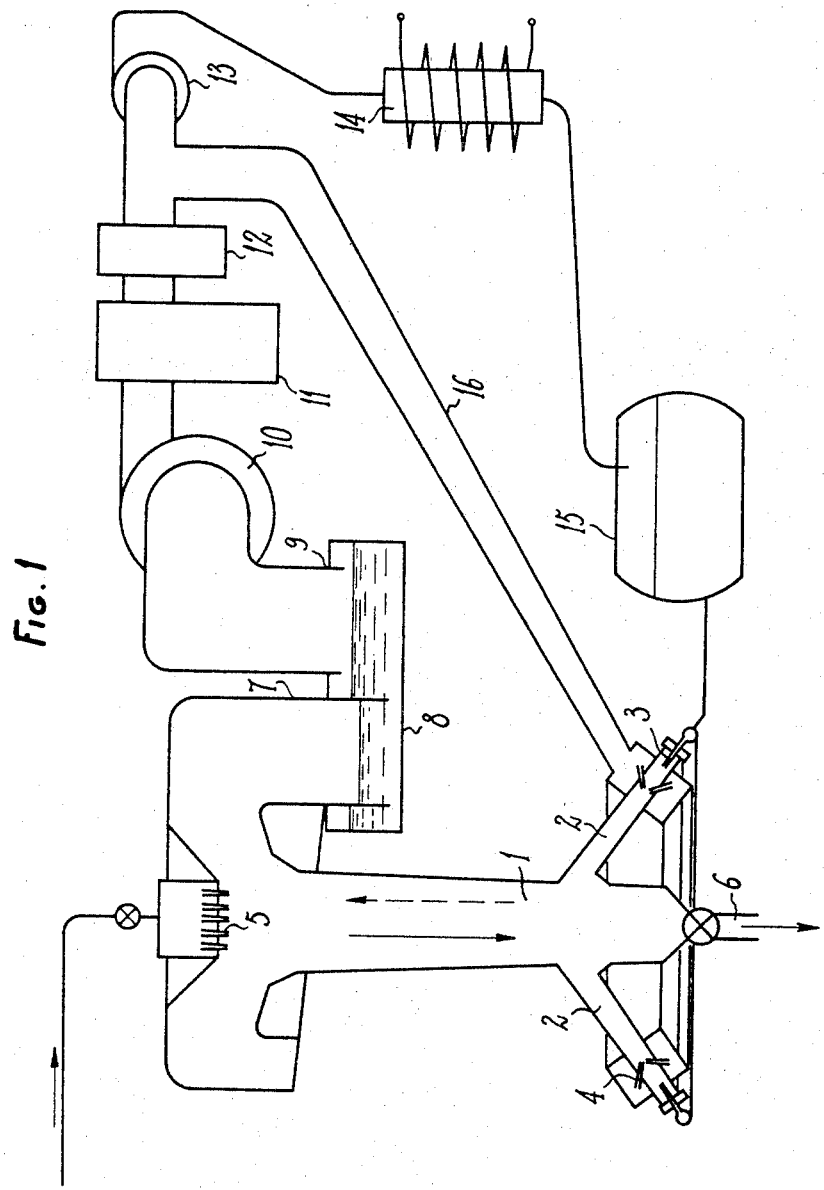

The present invention relates to methods of and an apparatus for deep-freezing products, notably liquid products such as more particularly liquid foods. It is concerned with deep-freezing methods wherein the product to be deep-frozen is brought to a temperature of about $-80°$ C. ($-112°$ F.) by using carbon dioxide ($CO_2$) as a refrigerant.

The method of this invention consists in injecting into the lower portion of a tower-shaped vessel carbon dioxide gas at a low temperature which may be about $-80°$ C. ($-112°$ F.), and atomizing into the upper portion of said vessel the product to be deep-frozen, the carbon dioxide gas and the product thus circulating in counter-current relationship during the product freezing treatment.

According to another feature characterizing this invention the flow rate of the carbon dioxide through the tower is adjusted in order to regulate the cooling of the product.

According to another characteristic feature of the method of this invention applied more particularly to liquid products, regularly calibrated drops of the product to be frozen are atomized into the tower by means of a metering pump and a nozzle system.

The method according to this invention has many very important features with respect to hitherto known methods also based on the use of carbon dioxide gas as a refrigerant. Some of these valuable features are set forth hereinafter.

The carbon dioxide gas is used only in its gaseous phase, whereby the formation of crystals likely to be detrimental in the system is definitely avoided.

The carbon dioxide gas and the product to be deep-frozen circulate in counter-current relationship, with the twofold advantage of promoting heat transfer conditions and obtaining a relatively long freezing time which may be for example several minutes or more. This freezing time is controllable and permits of preserving the whole or part of the characteristics and principles of the treated products.

On the other hand, the height of the tower and/or the rate of upward flow of the carbon dioxide gas therein are so calculated that the product to be treated reaches a temperature approximating $-80°$ C. ($-112°$ F.) before attaining the lower portion of the tower, so that the complete mass is compulsorily brought to this temperature.

The diameter of the granules of deep-frozen product may be of the order of 2 millimeters (0.08″) and can easily be modified if required.

The use of granulators is dispensed with.

When the deep-frozen products are intended for a subsequent drying or lyophilization treatment, the advantageous features set forth in the two last paragraphs hereinabove are particularly important since they permit of obtaining the products at exactly the desired and suitable granulometry, without any objectionable fine particles.

Figure 2:
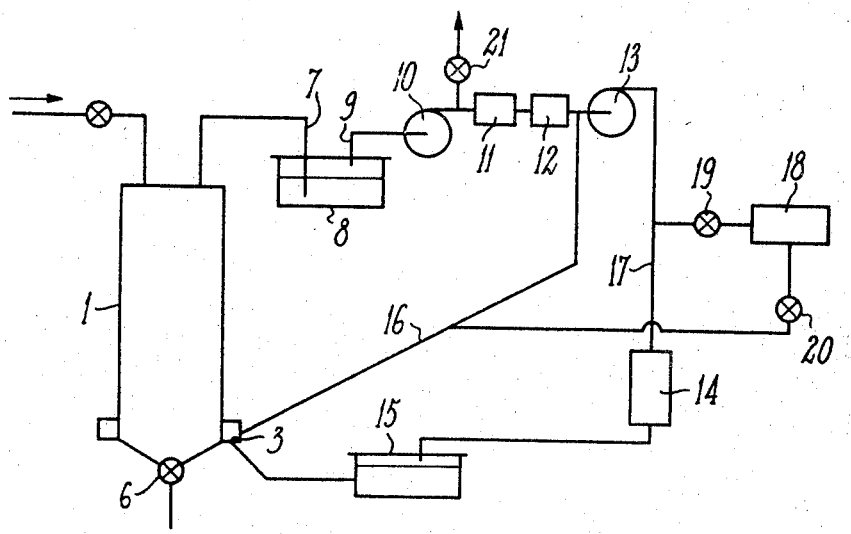
Figure 3:
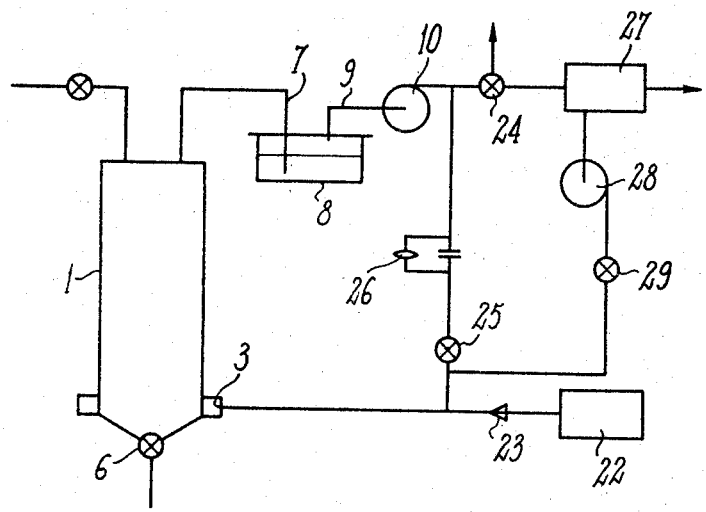

Other features and advantages of this invention will appear as the following description proceeds with reference to the accompanying drawing illustrating diagrammatically by way of example various forms of embodiment of this invention. In the drawing:

FIGURE 1 is a synoptic illustration of a first form of embodiment of a deep-freezing unit according to this invention; and FIGURES 2 and 3 are similar views of modified forms of embodiment of the same unit.

The unit illustrated in FIGURE 1 comprises a vertical tower 1 equipped at its lower portion with injectors 2 for supplying gaseous $CO_2$ at a temperature of about $-75°$ C. to $-79°$ C. ($-102°$ F. to $-110°$ F.) and under a pressure slightly in excess of the atmospheric value.

The product to be deep-frozen, for example fruit juice, is introduced into the tower 1 at the upper portion thereof through atomizers 5.

The carbon dioxide gas flows upwards in the tower and cools the drops of liquid product to be treated, for example fruit juice, until they are deep-frozen at about $-75°$ C. to $-79°$ C. ($-102°$ F. to $-110°$ F.). During this upward flow the carbon dioxide gas retards the fall of the liquid drops, so that the freezing time can be as long as desired.

The carbon dioxide gas emerging from the tower is thus brought to a higher temperature which may be for example of the order of $-30°$ C. ($-22°$ F.). A recycling compressor 10 forces the used gas through ducts 7 and 9 into a bath 8 retaining the entrained liquid particles and introduces the purely gaseous flow into a drier 11 and a separator or cyclone 12. From the outlet of this separator or cyclone one fraction of the gas is compressed by another compressor 13 and forced through a heat transfer unit 14 in which it is liquefied and directed into a storage tank 15 under a pressure of about 285 p.s.i. and at a temperature of $-20°$ C. ($-4°$ F.). The thus liquefied $CO_2$ is allowed to expand through a pressure reducing device 3 disposed upstream of the injectors 2. This expansion brings at $-79°$ C. ($-110°$ F.) the cold units necessary for cooling to $-75°$ C./$-79°$ C. ($-102°$ F. to $-112°$ F.) the $CO_2$ gas fraction recycled through duct 16 which is injected into the tower by means of the nozzles 4 opening into the aforesaid injectors 2.

The deep-frozen fruit-juice granules are extracted from the bottom of the tower through a gate or lock-chamber 6.

It will be seen that the greater part of the $CO_2$ is recycled directly through the duct 16, the other $CO_2$ fraction delivered to the heat transfer unit 14 corresponding only to the quantity necessary for reducing to $-75°$ C./$-79°$ C. the temperature of the $CO_2$ fed to the tower.

The liquid product to be deep-frozen is introduced into the upper portion of the tower in such a way that all the drops of product built up therein have the same diameter and remain separate from one another or, in other words, that they do not tend to agglomerate. Therefore, it is necessary that a given drop B following a preceding one A moves outside the turbulent zone created by this drop A. Under these conditons, both drops A and B are retarded substantially in the same manner by the forces resulting from the frictional viscous contact between the gas and the drops, so that they will both fall at the same speed; any coalescence is thus safely avoided. Besides, due to the possible lateral movements of the drops during their fall it is also necessary that the horizontal distance between any two adjacent drops be kept at a value sufficient to prevent these drops from contacting each other.

This twofold requirement may be met for example by utilizing static distributor, dispenser or atomizers comprising a plurality of suitably spaced nozzles delivering the drops at the requisite rate. A rotary injection device may also be used wherein suitably spaced projection orifices are provided.

The rate of gaseous flow through the tower and/or the gas temperature at the tower inlet may be adjusted according to the temperatures necessary for producing the desired deepfreezing and to the time during which this freezing is to be maintained. This temperature may be adjusted by properly proportioning the quantity of directly recycled gas and the gas fraction used for cooling this quantity.

In order to regulate the temperature of the cold gas in the freezing tower, a reheater may be inserted in the direct gas recirculation duct. The temperature of the gas flowing through the tower may be adjusted at will be properly modifying the action exerted by this reheater.

This disposal is objectionable however in that it requires the use of a reheater and therefore increases the power consumption.

A more advantageous arrangement consists in utilizing a vessel of which the outer wall without any heat insulation is in direct contact with the surrounding atmosphere and to which one fraction of the gas emerging from the tower is fed, the temperature of the gas recycled in the tower being adjusted by introducing gas taken from this auxiliary vessel into the recycling circuit.

In the form of embodiment illustrated in FIGURE 2 a vessel 18 without heat-insulation is disposed between the ducts 16 and 17, and adapted to be filled with gas through a valve 19, another valve 20 controlling the communication between this vessel 18 and the duct 16. It is clear that by properly controlling by means of this valve 20 the quantity of gas stored in vessel 18 it is possible to regulate at will the temperature of the gas fed into the tower. To compensate the gas output thus injected a gaged leak-gas venting valve 21 is provided.

In the from of embodiment illustrated in FIGURE 3, the gas emerging from the top of tower 1 is cooled before being reinjected into this tower by using a liquefied gas output taken from a reservoir 22 and expended in a pressure-reducing device 23. The gas constantly injected into the tower is vented to the outside through another gaged leak-gas valve 44.

The recycled gas output is adjusted by means of a valve 25 and measured by means of a vacuum meter 26.

To modify the mean gas temperature a warm gas storage vessel 27 without heat-insulation is provided. The gas contained in this vessel is reinjected into the circuit by using a fan 28 and a valve 29.

The method of this invention may be carried out in various manners.

It may be of the continuous type, that is, wherein the liquid product to be deep-frozen is fed continuously into the deep-freezing vessel or tower.

However, a batchwise procedure may also be used, wherein the liquid to be deep-frozen is introduced into the deep-freezing vessel or tower until a suspension of this liquid is formed which fills the tower nearly completely.

The deep-freezing process is then completed and by properly regulating the rate of flow of the carbon dioxide gas in the vessel the deep-frozen product is exhausted and the cycle resumed.

This batchwise process can be carried out without difficulty by properly controlling the valve inserted in the duct 16 for adjusting the quantity of gas recycled within the deep-freezing vessel.

The liquid product to be deep-frozen may be introduced in a discontinuous manner by using a metering pump and a stop and regulating valve.

Another advantageous feature of this batchwise or discontinuous method is that the height of the deep-freezing vessel can be reduced.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. An apparatus for deep-freezing products, notably liquid products such as liquid foods, which comprises a tower provided at its lower portion with injectors for introducing gaseous carbon dioxide therein at a pressure slightly greater than the atmospheric pressure, a lock chamber for discharging the deep-frozen product, and at its upper portion metering means for atomizing predetermined quantities of the product to be deep-frozen and converting same into drops, a circulation compressor adapted to draw the gaseous $CO_2$ as it emerges from said tower, nozzle means associated with said injectors, a liquid-filled vessel through which said gas is caused to bubble before penetrating into the suction side of said circulation compressor, a drier and a cyclone separator disposed in series on a same duct connected to the delivery side of said compressor, other duct means connected to the outlet of said cyclone separator for dividing the purified $CO_2$ stream into two fractions, said other duct means comprising to this end two branch ducts, one branch duct being adapted to direct one fraction of said purified $CO_2$ towards said nozzle means, the other branch duct incorporating another compressor, a heat-transfer unit and a storage tank for liquid $CO_2$, said other compressor being adapted to force the relevant gaseous $CO_2$ fraction through said heat-transfer unit to convert it into liquid $CO_2$ subsequently stored in said tank, pipe means for connecting said storage tank to said injectors, and pressure-reducing devices disposed upstream of said injectors for reducing the pressure of the liquid $CO_2$ from about 285 p.s.i. at a temperature of $-20°$ C. ($-4°$ F.) as obtained in said tank to the value causing the temperature of said $CO_2$ to attain a value of about $-79°$ C. ($-110°$ F.) for properly cooling the gas fraction recycled directly through said one branch duct and nozzle means.

2. A device as set forth in claim 1, wherein said atomizers disposed at the upper portion of said tower are adapted to deliver the product to be deep-frozen in the form of drops spaced from one another to prevent them from coalescing with one another.

References Cited

UNITED STATES PATENTS

| | | | |
|---|---|---|---|
| 1,104,920 | 7/1914 | Osborne | 62—74 |
| 3,188,825 | 6/1965 | Van Olphen | 62—347 X |
| 3,290,788 | 12/1966 | Seelandt | 34—5 |
| 3,313,032 | 4/1967 | Malecki | 34—5 |
| 3,319,344 | 5/1967 | Sachsel et al. | 34—5 |

ROBERT A. O'LEARY, Primary Examiner.

W. E. WAYNER, Assistant Examiner.